US012573243B2

(12) United States Patent
Lee et al.

(10) Patent No.: US 12,573,243 B2
(45) Date of Patent: Mar. 10, 2026

(54) AUTOMATED SECURITY DOMAIN MANAGEMENT SERVER USING USAGE PATTERN ASSOCIATED WITH TOLLGATE PASSAGE AND VEHICLE COMMUNICATING WITH SERVER

(71) Applicants: Hyundai Motor Company, Seoul (KR); Kia Corporation, Seoul (KR)

(72) Inventors: Seungjae Lee, Gwangmyeong-Si (KR); Dongchan Shin, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/630,795

(22) Filed: Apr. 9, 2024

(65) Prior Publication Data

US 2025/0078580 A1     Mar. 6, 2025

(30) Foreign Application Priority Data

Aug. 29, 2023    (KR) ........................ 10-2023-0114058

(51) Int. Cl.
| | |
|---|---|
| *G07B 15/06* | (2011.01) |
| *G06Q 20/40* | (2012.01) |
| *G07B 15/02* | (2011.01) |
| *H04W 4/44* | (2018.01) |

(52) U.S. Cl.
CPC ....... *G07B 15/063* (2013.01); *G06Q 20/4014* (2013.01); *G07B 15/02* (2013.01); *H04W 4/44* (2018.02)

(58) Field of Classification Search
CPC .. G07B 15/00–15/063; G06Q 2240/00; G06Q 20/00
See application file for complete search history.

(56) References Cited

U.S. PATENT DOCUMENTS

| | | | |
|---|---|---|---|
| 2005/0086100 A1* | 4/2005 | Yanagisawa ........... | G07B 15/02 705/13 |
| 2010/0145776 A1* | 6/2010 | Eguchi ................... | G08G 1/017 705/13 |
| 2011/0000962 A1* | 1/2011 | Chan ...................... | G07B 15/00 235/382 |

(Continued)

OTHER PUBLICATIONS

Popa, et. al, VPriv: Protecting privacy in location-based vehicular services, 2009 (Year: 2009).*

*Primary Examiner* — Daniel Vetter
(74) *Attorney, Agent, or Firm* — Banner & Witcoff, Ltd.

(57) ABSTRACT
According to the disclosure, a server may include: a communication device configured to communicate with a vehicle; and a processor configured to determine, based on first passage information associated with a tollgate, usage pattern information of the vehicle, wherein the first passage information is received from the vehicle at a first time. The server may further include memory configured to store the determined usage pattern information of the vehicle. The processor may be further configured to: determine, based on second passage information received from the vehicle at a second time after the first time whether usage of the vehicle is consistent with the stored usage pattern information, and, based on a determination that the usage of the vehicle is inconsistent with the stored usage pattern information, transmit, to the vehicle, a request to confirm the usage of the vehicle.

6 Claims, 10 Drawing Sheets

(56) References Cited

U.S. PATENT DOCUMENTS

| | | | | |
|---|---|---|---|---|
| 2012/0278137 A1* | 11/2012 | Dixon | .................. | G06Q 20/343 |
| | | | | 705/13 |
| 2017/0300716 A1* | 10/2017 | Reisgies | .............. | G06F 21/606 |
| 2018/0374279 A1* | 12/2018 | Siegl | .................... | G06Q 20/145 |
| 2019/0164356 A1* | 5/2019 | Sagesaka | ........... | G06K 7/10297 |
| 2020/0143224 A1* | 5/2020 | Wagle | ................... | G07B 15/02 |
| 2020/0320510 A1* | 10/2020 | Warnez | ................. | G06Q 20/36 |
| 2022/0277279 A1* | 9/2022 | Woo | .................. | G06Q 30/0284 |
| 2022/0366728 A1* | 11/2022 | Morizono | ........... | G06Q 20/367 |
| 2023/0222486 A1* | 7/2023 | Lee | ..................... | G06Q 20/351 |
| | | | | 705/39 |
| 2024/0302176 A1* | 9/2024 | Bandi | ............... | G01C 21/3469 |

* cited by examiner

3

| SECOND COMMUNICATION DEVICE | ~310 |

| SECOND PROCESSOR | ~320 |

| SECOND MEMORY | ~330 |

FIG. 7

| TOLLGATE IDENTIFICATION INFORMATION / USER IDENTIFICATION INFORMATION | TOLLGATE A | TOLLGATE B | TOLLGATE C |
|---|---|---|---|
| FIRST USER | 8:00 - 8:20 | 9:00 - 9:30 | |
| | 19:00 - 19:20 | 18:00 - 18:30 | |
| SECOND USER | | | 10:00 - 10:30 |
| | | | 20:00 - 21:00 |

AUTOMATED SECURITY DOMAIN MANAGEMENT SERVER USING USAGE PATTERN ASSOCIATED WITH TOLLGATE PASSAGE AND VEHICLE COMMUNICATING WITH SERVER

CROSS-REFERENCE TO RELATED APPLICATION

This application claims the benefit of Korean Patent Application No. 10-2023-0114058, filed on Aug. 29, 2023 in the Korean Intellectual Property Office, the entire contents of which are incorporated herein by reference.

BACKGROUND

1. Field

The disclosure relates to a server that collects a toll using an Electronic Toll Collection System (ETCS), and a vehicle communicating therewith.

2. Description of the Background

An Electronic Toll Collection System (ETCS), such as a HI-PASS device used in expressways in South Korea, automatically charges users a toll by using a standardized application interface of the dedicated short-range communication (DSRC) protocol.

The ETCS is a system capable of automatically transmitting and receiving toll information between roadside equipment and a terminal of a vehicle (e.g., on-board equipment or an ETCS terminal) based on the DSRC protocol.

The ETCS may recognize a class of a vehicle using a vehicle classification device when the vehicle enters a tollgate, communicate with a vehicle terminal device using an antenna, and transmit toll information corresponding to the class of vehicle to the vehicle terminal device based on the communication with the vehicle terminal device.

In addition to the recognition of vehicle class using the vehicle class classification device and communication with the vehicle terminal device using an antenna, the ETCS may also recognize road information used by the vehicle based on the communication with the vehicle terminal device, obtain toll information based on the recognized road information and vehicle class, and transmit the obtained toll information to the vehicle terminal device.

In some implementations, a toll is paid using a postpaid card or prepaid card inserted into a slot in a vehicle terminal device, causing the inconvenience of having to obtain the postpaid card or prepaid card from a credit card company to automatically pay tolls, as well as the inconvenience to the users themselves having to insert the prepaid card or postpaid card into the vehicle terminal device. In the case of prepaid cards, users have to charge the amount in advance. Also, a risk of losing the postpaid or prepaid card inserted into the vehicle terminal device may be present.

Accordingly, in some implementations, vehicle terminal devices may pay tolls using an embedded Integrated Circuit (IC) chip.

SUMMARY

An aspect of the disclosure provides a server that may determine whether usage information of a first terminal device deviates from pre-stored usage pattern information to identify whether the first terminal device is being used normally, and delete payment registration information stored in the first terminal device in response to abnormal use of the first terminal device, and a vehicle communicating with the server.

Another aspect of the disclosure provides a server that may determine whether a vehicle user has changed when confirmation information about whether a first terminal device is being used normally is not received, and delete payment registration information stored in the first terminal device in response to a change in the vehicle user, and a vehicle communicating with the server.

Additional embodiments of the disclosure will be set forth in part in the description which follows and, in part, will be obvious from the description, or may be learned by practice of the disclosure.

According to one or more example embodiments of the present disclosure, a server may include: a communication device configured to communicate with a vehicle; and a processor configured to determine, based on first passage information associated with a tollgate, usage pattern information of the vehicle. The first passage information may be received from the vehicle at a first time. The server may further include memory configured to store the determined usage pattern information of the vehicle. The processor may be further configured to: determine, based on second passage information received from the vehicle at a second time after the first time, whether usage of the vehicle is consistent with the stored usage pattern information, and based on a determination that the usage of the vehicle is inconsistent with the stored usage pattern information, transmit, to the vehicle, a request to confirm the usage of the vehicle.

The processor may be configured to determine the usage pattern information of the vehicle by: collecting, over a predetermined time period, the first passage information associated with the tollgate; and determining the usage pattern information of the vehicle based on the first passage information collected over the predetermined time period.

The processor may be configured to determine whether the usage of the vehicle is consistent with the stored usage pattern information by: comparing the stored usage pattern information with a portion, of the second passage information, that was recorded after a last start ON command of the vehicle was received by the vehicle.

The processor may be configured to determine whether the usage of the vehicle is consistent with the stored usage pattern information by: obtaining, based on the second passage information, usage information of the vehicle. The usage information may include: identification information associated with the tollgate, and passage time information associated with the tollgate; comparing the usage information with the stored usage pattern information of the vehicle to determine whether the usage of the vehicle deviates from the stored usage pattern information of the vehicle; and determining that the usage of the vehicle is inconsistent with the stored usage pattern information based on a determination that the usage of the vehicle deviates from the stored usage pattern information of the vehicle.

The processor may be further configured to: based on receiving, from the vehicle, a confirmation of the usage of the vehicle, determine whether the received confirmation indicates that a first user associated with the second passage information is different from a second user associated with the stored usage pattern information of the vehicle; and transmit, to the vehicle and based on a determination that the received confirmation indicates that the first user is different from the second user, a request to delete payment registration information stored in the vehicle.

The processor may be further configured to: based on not receiving, from the vehicle, a confirmation of the usage of the vehicle, obtain first identification information associated with a user of the vehicle; and based on the first identification information being different from second identification information associated with a second user associated with the first passage information, transmit, to the vehicle, a request to delete of payment registration information stored in the vehicle.

The server may be a first server. The communication device may be configured to communicate with a second server. The processor may be further configured to, based on receiving, from the second server, a request to delete payment registration information stored in the vehicle, transmit the received request to the vehicle.

The stored usage pattern information of the vehicle may include usage pattern information of a terminal device provided in the vehicle. The terminal device may include an integrated circuit (IC) chip for toll payment at the tollgate.

According to one or more example embodiments of the present disclosure, a vehicle may include a first terminal device including an integrated circuit (IC) chip. The IC chip may be configured to store payment registration information for toll payment. The vehicle may further include a communication device configured to communicate with a server; and a processor configured to: transmit, to the server and based on a toll being paid at a tollgate via the first terminal device, passage information associated with the tollgate; and cause, based on receiving, from the server, a request to delete the payment registration information, deletion of the payment registration information stored in the IC chip.

The vehicle may further include: a second terminal device including a user interface. The processor may be further configured to: cause, based on receiving, from the server, an indication of abnormal use of the first terminal device, the second terminal device to display a message associated with the received indication, and transmit, based on receiving user information from the second terminal device, transmit, to the server, the user information.

The second terminal device may be configured to: recognize a user; perform user authentication for the recognized user; and transmit, to the first terminal device and based on a result of the user authentication, one of a user authentication success indication or a user authentication failure indication. The first terminal device may be configured to, based on receiving the user authentication success indication, cause the IC chip to be activated.

The second terminal device may be configured to recognize the user by: receiving identification information of the user; and recognizing the user based on the received identification information.

The second terminal device may be configured to perform the user authentication by: receiving authentication information of the recognized user; and comparing the received authentication information with pre-stored user authentication information associated with the user.

The vehicle may further include: an authentication device configured to perform user authentication. The processor may be further configured to transmit, to the first terminal device, one of: a user authentication success indication received from the authentication device, or a user authentication failure indication received from the authentication device. The first terminal device may be configured to, based on receiving the user authentication success indication, cause the IC chip to be activated.

The vehicle may further include: a second terminal device including a user interface. The second terminal device may be configured to: store an application for CarPay service; output an image corresponding to execution of the stored application; and transmit, to the first terminal device, payment registration information received through the application. The first terminal device may be further configured to, based on the payment registration information, issue a card through the IC chip.

The communication device may be further configured to communicate with a mobile device. The processor may be further configured to: receive payment registration information that is registered to an application executable on the mobile device; and transmit, to the first terminal device, the received payment registration information. The first terminal device may be further configured to, based on the payment registration information, issue a card through the IC chip.

The server may be a first server. The communication device may be configured to communicate with a second server. The processor may be further configured to, based on receiving, from the second server, a request to delete payment registration information, transmit the received request to the first terminal device. The first terminal device may be configured to, based on receiving the transmitted request, delete the payment registration information stored in the IC chip.

The processor may be further configured to transmit, to the first terminal device and based on receiving, from the server, user change indication associated with the vehicle, a request to delete the payment registration information. The first terminal device may be configured to, based on receiving the request, delete the payment registration information stored in the IC chip.

The processor may be further configured to: obtain and store usage pattern information associated with the first terminal device based on historic passage information that is associated with a tollgate and is collected over a predetermined time period; and determine, based on a portion, of the passage information, that was recorded after a last start ON command was received by the vehicle, whether usage of the first terminal device is consistent with the stored usage pattern information.

The vehicle may further include: a second terminal device including a user interface. The processor may be further configured to, in response to a determination that the usage of the first terminal device is inconsistent with the stored usage pattern information, cause the second terminal device to output a message indicating a request to confirm the usage of the first terminal device.

BRIEF DESCRIPTION OF THE DRAWINGS

These and/or other embodiments of the disclosure will become apparent and more readily appreciated from the following description of the embodiments, taken in conjunction with the accompanying drawings of which:

FIG. 7 is a diagram illustrating an example of a usage pattern of a first terminal device obtained by a first server according to an embodiment;

DETAILED DESCRIPTION

Figure 1:
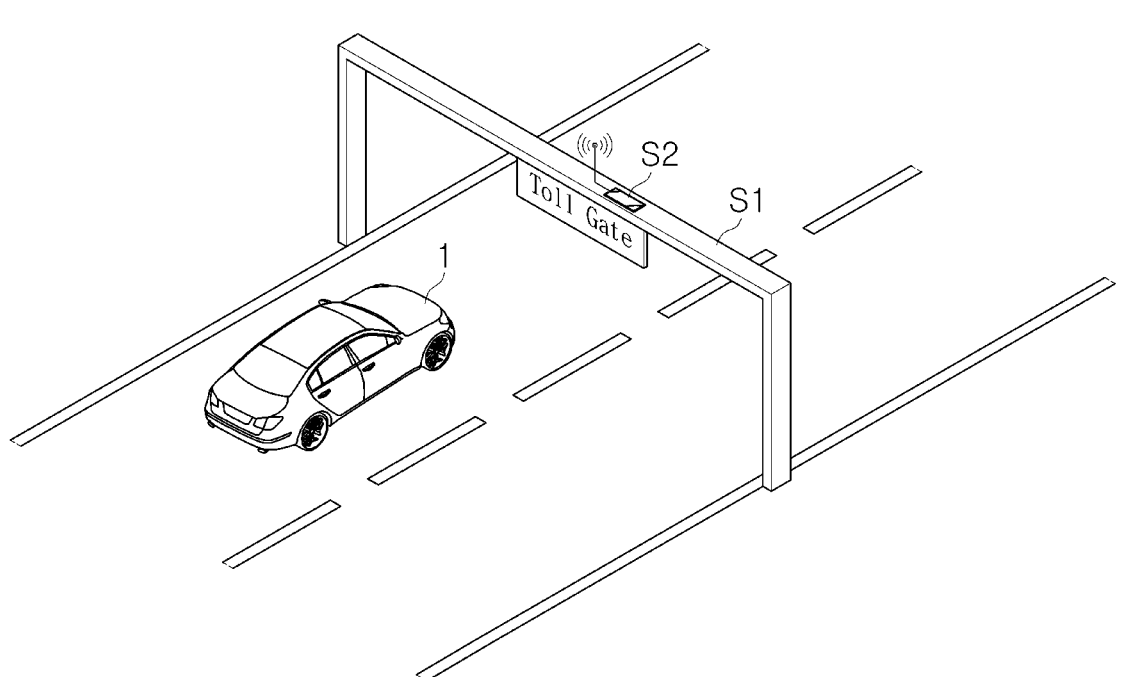
FIG. 1 is a diagram illustrating a configuration of an Electronic Toll Collection System (ETCS) including a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it may be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of at least one other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc., may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, embodiments of the disclosure will be described in detail with reference to the accompanying drawings.

FIG. 1 is a configuration diagram of an Electronic Toll Collection System (ETCS) including a vehicle according to an embodiment.

Referring to FIG. 1, the ETCS according to an embodiment may include a Road Side Equipment (RSE, S2) provided on one side of a tollgate S1, and a vehicle 1 passing through the tollgate S1.

The ETCS is a system capable of automatically transmitting and receiving toll information between the RSE S2 and the vehicle 1 based on Dedicated Short-Range Communication technology.

The RSE S2 may include a transmission and reception antenna for communication with the vehicle 1. The RSE S2 may automatically request toll payment from the vehicle 1 through communication with the vehicle 1.

The RSE S2 may recognize a class of vehicle 1 passing through the tollgate S1 through communication with the vehicle 1, and may request the vehicle to pay a toll corresponding to the recognized vehicle class.

A vehicle class refers to a size of vehicle, such as compact, midsize, and full-size vehicles.

The RSE S2 may communicate with a server (not shown) of a toll road authority.

The RSE S2 may transmit identification information of the tollgate S1 (tollgate identification information), passage time information, identification information of the vehicle, and toll information to the server (not shown).

The vehicle 1 may radiate electromagnetic waves to the outside through an antenna (not shown).

The vehicle 1 may receive electromagnetic waves emitted from at least one of the RSE S2 or the server (not shown) through the antenna (not shown), and may convert the received electromagnetic waves into electrical signals.

The vehicle 1 may demodulate the electromagnetic waves received through the antenna (not shown) to convert into electrical signals, may obtain a control signal corresponding to the converted electrical signal and use the obtained control signal to control the vehicle 1.

The vehicle 1 may receive passage information from the RSE S2. The passage information may include tollgate identification information, passage time information, and toll information.

The vehicle 1 may automatically pay the toll based on the received passage information.

Figure 2:
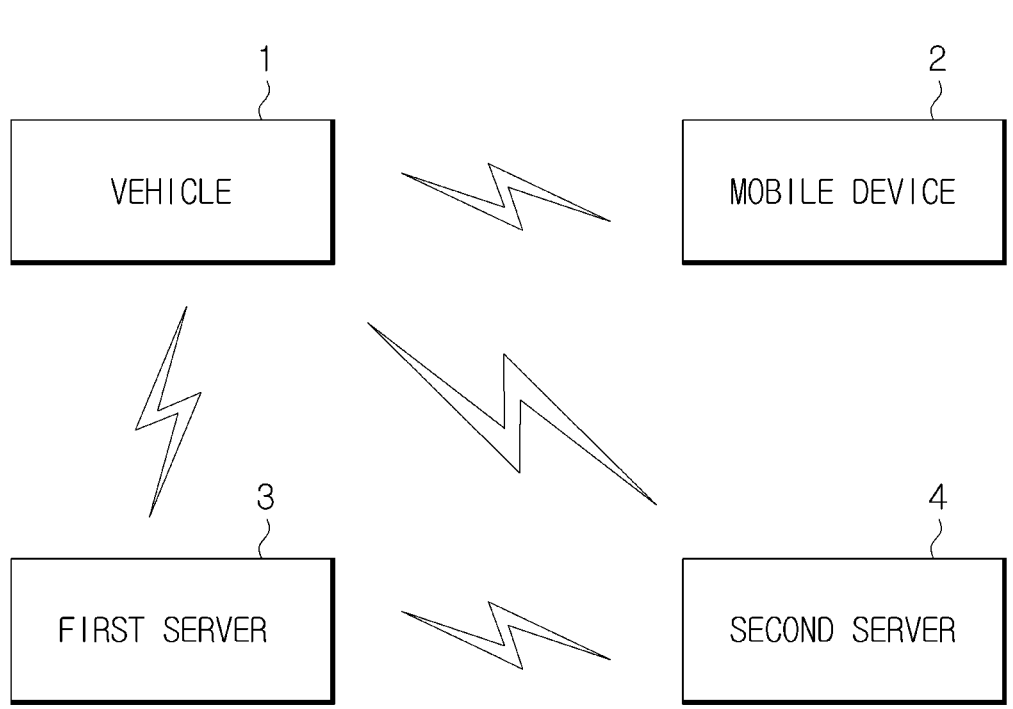
FIG. 2 is a diagram illustrating an example of communication of a vehicle according to an embodiment.

FIG. 2 is a diagram illustrating an example of communication of a vehicle according to an embodiment.

The vehicle 1 may communicate with a mobile device 2, a first server 3, and a second server 4.

The vehicle 1 may receive and store identification information of a user. The vehicle 1 may receive information of the mobile device 2 by linking to the mobile device 2, process the received information of the mobile device 2, and display the received or processed information of the mobile device 2 (e.g., display a message associated with an indication of abnormal use). The vehicle 1 may transmit information stored in the vehicle and operation information of the vehicle to the mobile device 2.

The vehicle 1 may process information received from the first server 3, and may display the information received from the first server 3.

The vehicle 1 may transmit the information stored in the vehicle 1 and the operation information of the vehicle 1 to the first server 3.

The vehicle 1 may process information received from the second server 4, and may display the information received from the second server 4.

The vehicle 1 may transmit the information stored in the vehicle 1 and the operation information of the vehicle 1 to the second server 4.

The mobile device 2 may communicate with the vehicle 1 through at least one of a Bluetooth Low Energy (BLE) module, an Ultra Wide Band (UWB) module, or a Near Field Communication (NFC) module.

The mobile device 2 may remotely control the vehicle 1, and may perform payment for services used by the user or goods purchased by the user.

A first application for a CarPay service and a second application for a remote control service of the vehicle 1 may be set up on the mobile device 2.

The second application may be an application for digital key service.

The first and second applications may also be implemented as one application. In this case, the second application may also perform the CarPay service.

The identification information of the user, identification information of the mobile device, identification information of the vehicle, and payment registration information may be registered and stored through the first and second applications set up on the mobile device 2.

The identification information of the mobile device 2 is unique identification information of the mobile device 2, and may include at least one of phone number, Wi-Fi MAC Address, serial number, or International Mobile Equipment Identity (IMEI) of the mobile device 2.

The identification information of the mobile device 2 may include Bluetooth Identification information (BTID).

The identification information of the user (user identification information) may include information about at least one of the user's name, user's date of birth, user's social security number, user's gender, user's phone number, user's home address, user's work address, user's driving license information, or user's email address.

The identification information of the vehicle 1 (vehicle identification information) may include information about a vehicle class, vehicle model, serial number, vehicle identification number, vehicle license plate, and power generation method (e.g., hybrid, electric, internal combustion engine, hydrogen, etc).

The vehicle class may be classified based on at least one of engine displacement, vehicle length, vehicle width, or vehicle height. In this case, the vehicle may be classified into compact, small, midsize, and full-size vehicle.

The payment registration information may include card information and account information.

The card information may include information about at least one of a card company, card number, expiration date, password, or security code (e.g., Card Verification Code (CVC)).

The account information may include information about a bank type, account number, account password, and account holder name.

The payment registration information may also include information about a daily payment limit, a maximum payment amount per transaction, and the maximum number of transactions per day.

The mobile device 2 may perform a membership registration (subscription) for the digital key service through the second application. In this instance, the mobile device 2 may receive and store a digital key (or electronic key) of vehicle from a vehicle manufacturer's server (not shown). Here, the digital key may include the identification information and authentication information of the mobile device 2, and vehicle control authority information.

The mobile device 2 may transmit, to the vehicle 1, the digital key stored in response to completion of subscription to the digital key service.

The mobile device 2 may receive user input for controlling the vehicle through the second application, and may display operation information of the vehicle.

The mobile device 2 may attempt to establish communication with the vehicle 1 in response to a command to perform the digital key service. In this instance, the mobile device 2 may transmit the digital key to the vehicle 1.

The digital key may include the identification information and the authentication information of the mobile device 2, and the vehicle control authority information, and may further include the vehicle identification information.

The mobile device 2 may perform a membership registration for the CarPay service through the first application.

The mobile device 2 may receive payment registration information of the vehicle's user using the vehicle through the first application, and register and store the received payment registration information of the user.

The mobile device 2 may execute the first application in response to completion of registration of the payment registration information. In this instance, the mobile device 2 may link the digital key service and the CarPay service.

The mobile device 2 may be implemented as a computer or portable terminal that may be connected to the vehicle 1 via a network.

The computer may include, for example, a laptop, a desktop, a tablet personal computer (PC), a slate PC, and the like, equipped with a web browser. The portable terminal may include, for example, all kinds of handheld-based wireless communication device that guarantee portability and mobility such as a Personal Communication System (PCS), a Global System For Mobile Communication (GSM), a Personal Digital Cellular (PDC), a Personal Handyphone System (PHS), a Personal Digital Assistant (PDA), an International Mobile Telecommunication (IMT)-2000, a Code Division Multiple Access (CDMA)-2000, a wideband CDMA (WCDMA), a WIRELESS BROAD-BAND INTERNET (WiBro) terminal, and a smartphone, and wearable devices such as a watch, ring, bracelet, anklet, necklace, eyeglasses, contact lenses, or Head-Mounted-Device (HMD), and the like.

The first server 3 may be a server of a company that issues and manages credit cards for toll payment (i.e., HI-PASS card).

The first server 3 may be a server of a company that issues and manages credit cards, or a server of an organization that collects and manages tolls.

The first server 3 may store payment registration information of users.

In response to receiving passage information from the vehicle, the first server 3 may store the received passage information, and may obtain usage pattern (e.g., toll usage pattern, tollgate usage pattern, etc.) information of the user's vehicle based on the passage information stored for a predetermined time period. Here, the predetermined time period may be a preset time period.

The first server 3 may store the obtained usage pattern information of the user's vehicle.

The first server 3 may determine whether the vehicle 1 is being used normally (e.g., within predetermined bounds, such as being consistent with a historical usage pattern) or abnormally (e.g., outside of the predetermined bounds, such as being inconsistent with a historical usage pattern) based on the usage pattern information.

The first server 3 may request confirmation of use of the vehicle 1 from the vehicle 1 or the mobile device 2 in response to abnormal use of the vehicle 1.

The first server 3 may request the vehicle 1 to delete the payment registration information in response to the abnormal use of the vehicle 1.

The first server 3 may request the vehicle 1 to delete the payment registration information in response to the confirmation of use of the vehicle 1.

In response to the abnormal use of the vehicle 1, the first server 3 may also determine whether the user of the vehicle has changed from a server (not shown) of toll road authority.

The server of the toll road authority may store identification information of vehicle users and identification information of vehicles.

The first server 3 may request the vehicle 1 to delete the payment registration information in response to a change in the vehicle user.

The first server 3 may request the mobile device 2 to delete the payment registration information in response to the change in vehicle user.

In response to a request for deletion of the payment registration information of the second server, the first server 3 may delete the stored payment registration information of the vehicle, and may request the vehicle 1 to delete the payment registration information.

The second server 4 may be a server of a company that provides and manages the first application.

The second server 4 may be a server of a company that provides and manages the second application.

The second server 4 may be a server provided at a service center, vehicle manufacturer, repair center, and the like that manages the vehicle 1. In addition, the second server 4 may be a server of an application (i.e., app) that provides services associated with the vehicle 1, and may be a telematics server or platform server.

The second server 4 may store identification information of users who registered as a member through the first application, identification information of vehicles, identification information of mobile devices, and payment registration information.

In response to receiving a command to delete payment registration information through the first application, the second server 4 may transmit the command to delete the payment registration information to the first server 3.

The second server 4 may transmit, to the first server 3, at least one of the vehicle identification information or the user identification information to allow the first server 3 to delete the payment registration information.

The second server 4 may store identification information of users who registered as a member through the second application, identification information of vehicles, and identification information of mobile devices.

Figure 3:
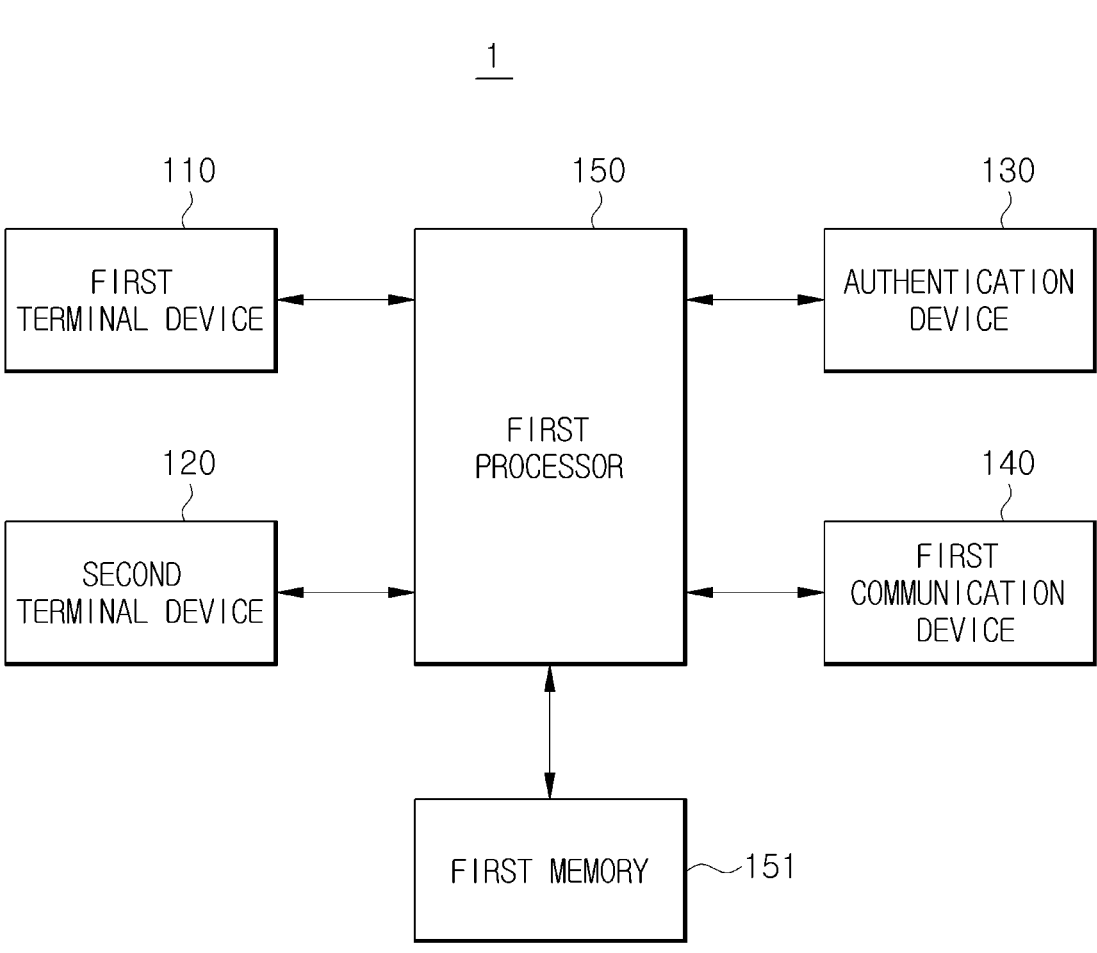
FIG. 3 is a control block diagram illustrating a vehicle according to an embodiment.

FIG. 3 is a control block diagram illustrating a vehicle according to an embodiment, which is described with reference to FIG. 4 and FIG. 5.

Figure 4:
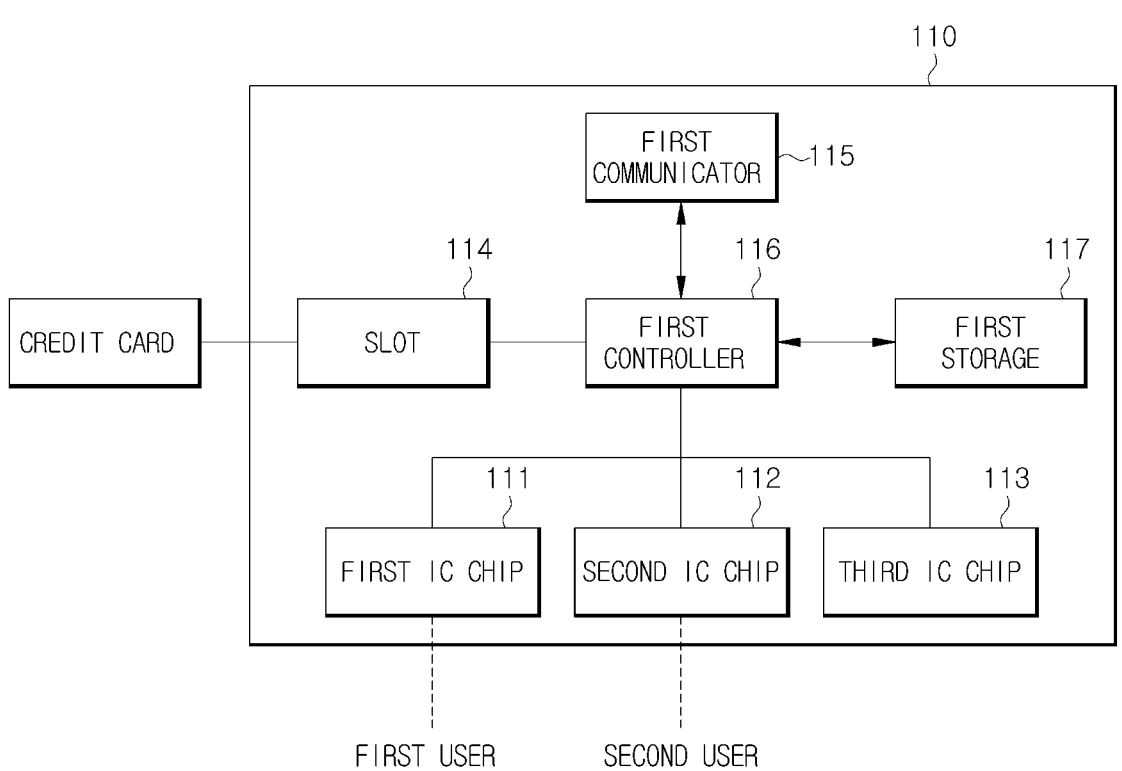
FIG. 4 is a control block diagram illustrating a first terminal device provided in a vehicle according to an embodiment.
Figure 5:
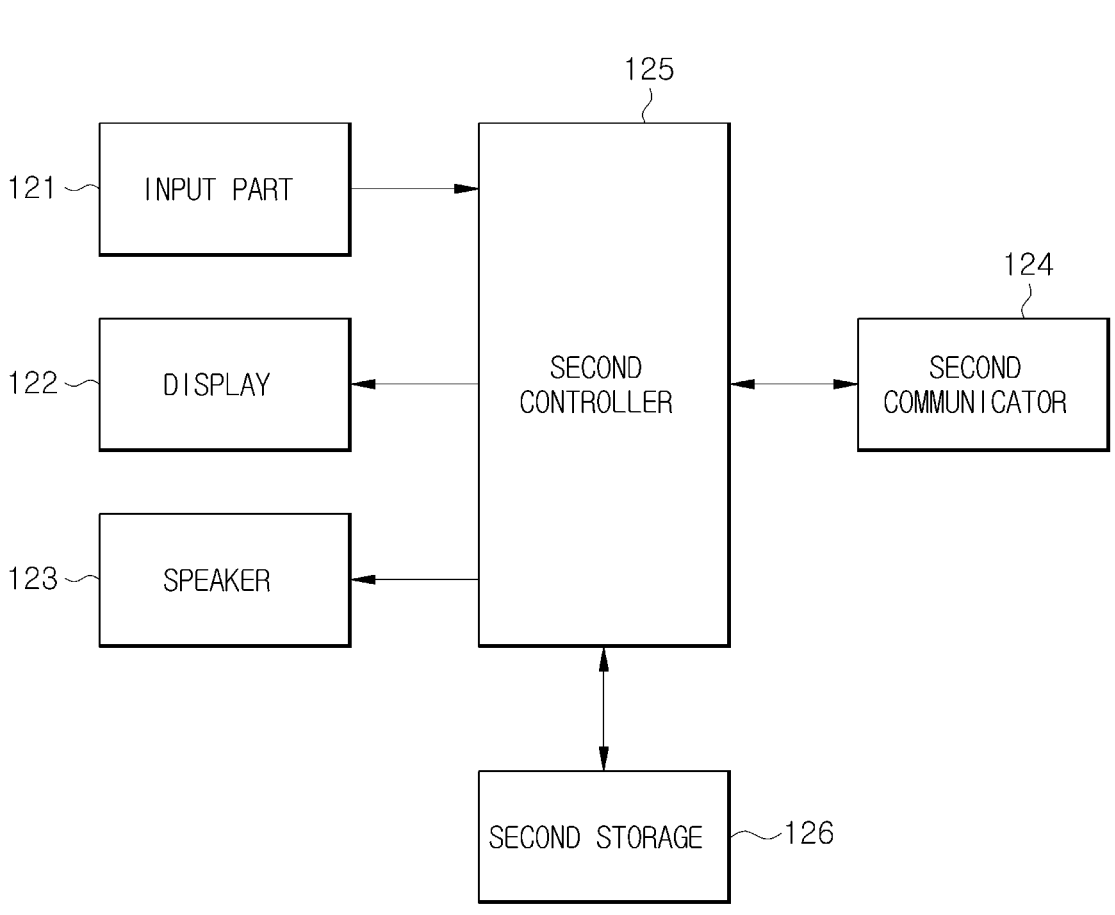
FIG. 5 is a control block diagram illustrating a second terminal device provided in a vehicle according to an embodiment.

FIG. 4 is a control block diagram illustrating a first terminal device provided in a vehicle according to an embodiment, and FIG. 5 is a control block diagram illustrating a second terminal device provided in a vehicle according to an embodiment.

The vehicle 1 may include a first terminal device 110, a second terminal device 120, an authentication device 130, a first communication device 140, a first processor 150, and a first memory 151.

In order to differentiate constituent components of the vehicle 1 from those of the first server 3, the constituent components of the vehicle 1 are referred to as "first" component, and the constituent components of the first server 3 are referred to as "second" component.

The first terminal device 110 may be mounted on a dashboard or be embedded in the dashboard.

The first terminal device 110 may be mounted on a rearview mirror or a front windshield glass.

In response to receiving payment registration information from the first server 3 or the first processor 150, the first terminal device 110 may store the received payment registration information.

The first terminal device 110 may match and store the payment registration information with user identification information.

The first terminal device 110 may communicate with the RSE S2 when entering the tollgate S1.

The first terminal device 110 may receive passage information from the RSE

S2, and pay a toll in response to receiving the passage information.

The first terminal device 110 may transmit the passage information to the first server 3 upon payment of the toll. The passage information may include toll information, tollgate identification information, passage date information, passage day information, and passage time information, and may further include tollgate location information.

When entering the tollgate, the first terminal device 110 may receive tollgate identification information from at least one of the second terminal device 120 or the first communication device.

The first terminal device 110 may transmit the user identification information and payment registration information to the first server 3 or the second server 4, when the passage information is transmitted to the first server 3.

The first terminal device 110 may store the passage information. The first terminal device 110 may match and store the passage information with the user identification information.

As shown in FIG. 4, the first terminal device 110 may include at least one Integrated Circuit (IC) chips 111, 112, and 113, a slot 114, a first communicator 115, a first controller 116, and a storage 117.

The IC chips may be integrated circuit chips made of semiconductors, and may not be affected by magnetic materials. Each of the IC chips may be in a form of embedded IC card whose card information is stored in the IC chip, not a physical card inserted into the slot.

The card information may include information about at least one of a card company, card number, expiration date, password, or security code (e.g., CVC).

The IC chip may be an embedded card in which account information is stored.

The account information may include information about a bank type, account number, account password, and account holder name.

Here, the card information and the account information may be payment registration information.

The payment registration information may also include information about a daily payment limit, a maximum payment amount per transaction, and the maximum number of transactions per day.

The IC chip may encrypt and store information. The IC chip may include a security processor.

The IC chip may store a certificate corresponding to a secret key of a public key infrastructure.

The IC chip may include a power terminal, a data transmission/reception terminal, and a clock transmission/reception terminal.

The following description is made with an assumption that the number of IC chips is three.

Each of the IC chips 111, 112, and 113 may include an Issuer Security Domain (ISD) which is initially permanently installed by a vehicle manufacturer and a Supplementary Security Domain (SSD) which is installed by a card company that provides payment services.

A structure of Security Domain (SD) including the ISD and SSD may comply with Global Platform (GP) card specification.

Deleting and changing information of each of the IC chips may be performed only by the ISD.

Each of the IC chips 111, 112, and 113 may perform payment based on the payment registration information registered through the first server 3 or the second server 4.

Each of the IC chips 111, 112, and 113 may perform payment based on the toll information received from the RSE S2 when the vehicle passes through the tollgate S1.

A physical card is inserted into the slot 114. The slot 114 may read information about the physical card and transmit the read information to the first controller 116.

The first communicator 115 may transmit and receive information between constituent components of the first terminal device 110.

The first communicator 115 may be connected to a vehicle network (NT) to perform communication.

The first communicator 115 may transmit information to the first processor 150 and receive information from the first processor 150.

The first communicator 115 may communicate with an external electronic device (e.g., the RSE S2, the first server 3, the second server 4, etc.) through wireless communication.

The first controller 116 may communicate with the first communication device 140 to recognize the vehicle 1, recognize a user, and determine whether the recognized user is the same as a user of the recognized vehicle. When the user of the recognized vehicle is the same as the recognized user and user authentication success information is received from at least one of the second terminal device 120 or the authentication device 130, the first controller 116 may control an IC chip corresponding to the recognized user to be activated.

The first controller 116 may confirm identification information of the user logged in through the second terminal device 120, and confirm payment registration information corresponding to the confirmed identification information. The first controller 116 may control activation of IC chip based on the confirmed payment registration information and payment registration information stored in the first storage 117. That is, the first controller 116 may control the IC chip corresponding to the user identification information to be activated.

When storing the payment registration information in at least one IC chip, the first controller 116 may store the payment registration information by encrypting a unique number assigned to the vehicle, not a vehicle license plate, in order to ensure security against theft, forgery, and alteration.

In response to receiving a first card issuance request, a security key, and the payment registration information through the first processor 150, the first controller 116 may store the payment registration information in the first IC chip 111 from among the plurality of IC chips by using the received security key. Specifically, by acquiring an SSD and applet corresponding to the payment registration information in the first IC chip 111 using the security key, the first controller 116 may issue the first IC chip 111 as a newly issued first card (e.g., a first virtual card). Here, the first card may be a card in the name of a first user.

Here, the acquisition of the SSD and the applet may be performed by an ISD.

The security key corresponds to a key having an authority to issue a new card, and may be issued by a Personal Secure Application Module (PerSAM).

The PerSAM is a card-type security device required to be used only according to a specified procedure in order to securely deliver a key for issuing a card (electronic currency). The PerSAM may be a module having key information required for issuance, and may be provided by a toll road authority that oversees the ETCS.

In a case where the first IC chip 111 is issued as the first card, the first controller 116 may obtain initialization Intersector Electronic Purse (IEP) data of the first card. That is, the first controller 116 may obtain and store initialization IEP data to be transmitted when entering the tollgate S1 in advance.

The initialization IEP data of the first card may include transaction serial number of the first card, a random number obtained from the first card, an identifier (ID) of an issuer of the first card, an ID of the first card, a balance of the first card, an ID of a toll road authority, an ID of a card service, and a signature value obtained by the first card.

The first controller 116 may obtain a session key by encrypting the transaction serial number of the first card, the random number obtained from the first card, and the key stored in the first card.

The first controller 116 may obtain a signature value by encrypting the ID of the issuer of the first card, the ID of the first card, the balance of the first card, and the session key.

When the vehicle 1 enters the tollgate S1, the first controller 116 may recognize the entry to the tollgate based on the identification information received from the RSE S2, and recognize the identification information of the tollgate S1.

The first controller 116 may control the first communicator 115 to transmit the initialization IEP data of the first card to the RSE S2, when recognizing the entry to the tollgate.

In response to the recognized and authenticated user being the first user, the first controller 116 may select the first card as an instance, and may perform billing communication for toll payment with the selected first card, thereby allowing the toll to be paid.

In response to receiving a card deletion request and an authorization key through the first processor 150, the first controller 116 may delete the payment registration information stored in the first IC chip 111 using the authorization key.

When payment registration information registered in any one IC chip is deleted, the first controller 116 may delete an SSD and applet.

The authorization key corresponds to a key having an authority to delete a card, and may be issued by PerSAM. In addition, the card deletion request may include an SSD deletion command and an applet deletion command.

In response to receiving a second card issuance request, security key, and payment registration information through the first processor 150, the first controller 116 may store the payment registration information in the second IC chip 112, which is an unissued IC chip from among the plurality of IC chips, by using the received security key. Specifically, by acquiring an SSD and applet corresponding to the payment registration information in the second IC chip 112 using the security key, the first controller 116 may issue the second IC chip 112 as a newly issued second card. Here, the second card may be a card in the name of a second user.

The first controller 116 may transmit passage information to the first processor 150, the first server 3, or the second server 4 upon completion of the toll payment.

The first controller 116 may include at least one memory storing a program for performing the above-described operations and operations described below, and at least one processor for implementing the stored program. When a plurality of memories and processors are provided, the plurality of memories and processors may be integrated into one chip, or provided in physically separate locations.

The first storage 117 may store a program that performs the above-described operations of the first controller 116. The first controller 116 may execute the program stored in the first storage 117.

The first storage 117 may be implemented with at least one of a volatile memory such as a Random Access Memory (RAM), a non-volatile memory such as a cache, a flash memory, a Read Only Memory (ROM), a Programmable Read Only Memory (PROM), an Erasable Programmable Read Only Memory (EPROM), an Electrically Erasable Programmable Read Only Memory (EEPROM), etc., or a recording media such as a Hard Disk Drive (HDD), or a Compact Disc Read Only Memory (CD-ROM), without being limited thereto.

The second terminal device 120 may be mounted on a dashboard or be embedded in the dashboard.

The second terminal device 120 may be a device for a user interface. That is, the second terminal device 120 may receive user input and output information corresponding to the user input.

The second terminal device 120 may output information about various functions performed in the vehicle 1 and information about various functions for user convenience.

The second terminal device 120 may be a device that performs audio, video, and navigation modes. The second terminal device 120 may be an Audio, Video, Navigation (AVN) device.

The second terminal device 120 may output navigation information in response to the navigation mode, output audio information in response to the audio mode, or output video information in response to the video mode.

The second terminal device 120 may be linked to the mobile device 2, and may receive and output information about the mobile device 2.

For example, the second terminal device 120 may display user's schedule information stored in the mobile device 2, output audio information stored in the mobile device 2, or receive destination information stored in the mobile device 2.

The second terminal device 120 may include an application for linking to the mobile device 2.

The second terminal device 120 may output an image for linking to the mobile device 2.

The second terminal device 120 may perform user authentication by linking to the mobile device 2.

The second terminal device 120 may perform a remote service for user convenience and may perform the CarPay service.

The second terminal device 120 may include a first application for the CarPay service and a second application for a remote control service.

The second terminal device 120 may perform user authentication.

The second terminal device 120 may transmit user identification information, user authentication success information, or user authentication failure information to at least one of the first terminal device 110 or the first processor 150.

The second terminal device 120 may output an image for the CarPay service and an image for guiding the user authentication.

The second terminal device 120 may transmit, to the first terminal device 110, at least one of navigation information, current location information of vehicle, or tollgate identification information.

The second terminal device 120 may transmit a user input to at least one of the first terminal device 110 or the first processor 150.

As shown in FIG. 5, the second terminal device 120 may include an input part 121, a display 122, a speaker 123, a second communicator 124, a second controller 125, and a second storage 126.

The input part 121 may receive a user input.

The user input may include selection information of navigation mode, destination information, route selection information, and selection information of CarPay service, and may also include a user authentication command.

The user input may include user identification information.

The user input may include a command to link to the mobile device 2.

The input part 121 may receive a user registration command to register a user of vehicle, and may receive a user deletion command to delete some of the registered users.

The input part 121 may receive a user registration command for the CarPay service and a user deletion command to delete some of the registered users.

The input part 121 may also receive user identification information, card information, account information, and identification information of at least one mobile device, as subscription information for user registration of the CarPay service.

The user identification information may include information about at least one of the user's name, user's date of birth, user's social security number, user's gender, user's phone number, user's home address, user's work address, user's driving license information, or user's email address.

The card information may include information about at least one of a card company, card number, expiration date, password, and security code (e.g., CVC).

The identification information of a mobile device is unique identification information of the mobile device, and may include at least one of phone number, Wi-Fi MAC Address, serial number, or IMEI of the mobile device.

The identification information of the mobile device 2 may be Bluetooth Identification Information (BTID).

The input part 121 may be implemented as at least one of a physical button, key, or switch.

The input part 121 may include a hardware device such as various buttons or switches, a pedal, a keyboard, a mouse, a track-ball, various levers, a handle, a stick, and the like.

The input part 121 may also include a Graphical User Interface (GUI) such as a touch pad, i.e., a software device. The touch pad may be implemented as a Touch Screen Panel (TSP) and form a mutual layer structure with a display panel of the display 122.

The input part 121 may receive identification information of the mobile device requesting sharing of the CarPay service, and may receive a command to approve or cancel the sharing.

In addition, the input part 121 may receive a command to start registration of biometric recognition information of a user, a command to end registration of the biometric recognition information, and a command to delete the biometric recognition information.

The display 122 may display information about a function being performed by the vehicle 1 or the second terminal device 120.

For example, the display 122 may display navigation information, information related to a phone call, information about content output through the mobile device 2, information related to music playback, or external broadcast information.

The display 122 may display a subscription image for user registration of the CarPay service.

The display 122 may display an image of the CarPay service in response to execution of the CarPay service, and may also display payment completion information and payment failure information as an image.

The display 122 may display identification information of the mobile device requesting the sharing of the CarPay service, and may display approval information of the CarPay service regarding completion of approval or rejection of the approval. The display 122 may display passage information when passing through a tollgate. The passage information may include tollgate identification information, toll information, passage date information, and passage time information, and may further include tollgate location information.

The display 122 may display user identification information, and may also display user authentication success information or user authentication failure information.

In addition, the display 122 may display an authentication request button image for requesting user authentication, and an authentication confirmation button image for informing the user to confirm authentication.

The display 122 may display a button image to link to the mobile device 2 and a button image to cancel linkage with the mobile device 2.

The display 122 may display the identification information of the mobile device 2.

The display 122 may display remote service information when a remote service function is performed.

The display 122 may also display communication state information with the mobile device 2. That is, the display 122 may display information about whether communication with the mobile device 2 may be performed.

The display 122 may be provided as a Cathode Ray Tube (CRT), a Digital Light Processing (DLP) panel, a Plasma Display Panel (PDP), Liquid Crystal Display (LCD) panel, Electro Luminescence (EL) panel, Electrophoretic Display (EPD) panel, Electrochromic Display (ECD) panel, Light Emitting Diode (LED) panel, organic LED (OLED) panel, and the like, without being limited thereto.

The second terminal device 120 may include only the display 122. In this case, the input part may be an input device provided on a head unit, center fascia, steering wheel, and the like.

The speaker 123 may output sound corresponding to output of the vehicle or the second terminal device 120.

The speaker 123 may output guide information about entering the tollgate, and may output the passage information as sound or voice.

The speaker 123 may output the navigation information as sound or voice.

The speaker 123 may output the user authentication success information or user authentication failure information as a voice.

At least one speaker 123 may be provided. The speaker 123 may be provided inside the vehicle.

The second communicator 124 may transmit and receive information between constituent components of the second terminal device 120.

The second communicator 124 may be connected to a vehicle network (NT) to perform communication.

The second communicator 124 may transmit information to the first processor 150 and receive information from the first processor 150.

The second communicator 124 may transmit information to the first terminal device 120 and receive information from the first terminal device 120.

The second communicator 124 may communicate with an external electronic device (e.g., RSE S2, etc.) through wireless communication.

The second communicator 124 may include a Global Positioning System (GPS) receiver for recognizing current location information of the vehicle.

The second controller 125 may control execution of the navigation mode in response to selection information of the navigation mode.

In response to receiving destination information through the input part 121, the second controller 125 may recognize current location information of the vehicle, obtain a route from the current location to the destination based on the recognized current location information and the destination information of the vehicle, and control the display 122 to display route information about the obtained route.

In a case where a plurality of routes are obtained, the second controller 125 may confirm route information corresponding to route selection information selected through the input part 121, obtain navigation information based on the confirmed route information, map information, and current location information, and control the display 122 and the speaker 123 to output the obtained navigation information.

The second controller 125 may request input of login information in response to receiving a start ON (e.g., engine ignition ON, electric motor ON, vehicle ON, etc.) command. In this case, the second controller 125 may control the display 122 to display a window for login input.

The second controller 125 may perform user authentication based on the login information input to the login input window.

The second controller 125 may request input of user identification information in response to receiving a start ON command, and may request user authentication in response to receiving the user identification information through the input part 121.

The second controller 125 may perform user authentication based on the user identification information received in the input part 121 and user authentication information received in the input part 121. For example, the user authentication information may include a password or an authentication pattern.

In response to receiving the password through the input part 121, the second controller 125 may determine whether the received password is identical to a pre-stored password. Based on a determination that the received password is identical to the pre-stored password, the second controller 125 may transmit user authentication success information to the first terminal device 110, and based on a determination that the received password is different from the pre-stored password, the second controller 125 may transmit user authentication failure information to the first terminal device 110.

In response to receiving authentication pattern information through the input part 121, the second controller 125 may determine whether the received authentication pattern information is identical to pre-stored authentication pattern information. Based on a determination that the received authentication pattern information is identical to the pre-stored authentication pattern information, the second controller 125 may transmit user authentication success information to the first terminal device 110, and based on a determination that the received authentication pattern information is different from the pre-stored authentication pattern information, the second controller 125 may transmit user authentication failure information to the first terminal device 110.

The second controller 125 may control at least one of the display 122 or the speaker 123 to output the user authentication success information or the user authentication failure information.

In response to receiving a start ON command, the second controller 125 may obtain biometric information of the user (user biometric information), and may automatically perform user authentication based on the obtained user biometric information.

The second controller 125 may also receive user authentication success information and user authentication failure information from the authentication device 130.

Based on the user authentication being successful, the second controller 125 may control activation of the first terminal device 110, and based on the user authentication not being successful, the second controller 125 may control deactivation of the first terminal device 110.

In addition, the second controller 125 may transmit identification information of a tollgate to the first terminal device 110 when entering the tollgate.

In response to receiving an information confirmation command of the first terminal device through the input part 121, the second controller 125 may control communication with the first terminal device, and control the display 122 to display identification information of the first terminal device obtained through communication with the first terminal device. The second controller 125 may also control the display 122 to display user identification information for each IC chip registered in the first terminal device, and control the display 122 to display payment history information of a successfully authenticated user.

The payment history information may be CarPay information. That is, in response to receiving a command to request confirmation of the CarPay information through the input part 121, the second controller 125 may receive the payment history information from the first terminal device, and control the display 122 to display the received payment history information as the CarPay information.

The second controller 125 may control the display 122 to display payment history information of the successfully authenticated user.

The second controller 125 may control the display 122 to display usage pattern information of vehicle of the successfully authenticated user. The usage pattern information of the vehicle may correspond to usage pattern information of the first terminal device, and may correspond to usage pattern information of an IC chip corresponding to the user identification information.

The second controller 125 may execute a program stored in the second storage 126.

The second controller 125 may execute a program corresponding to an application for the CarPay service, and control at least one of the display or the speaker to output an image corresponding to the execution of the program. The second controller 125 may transmit payment registration information received through the first application to the first terminal device upon the execution of the program.

The second storage 126 may store a program that performs the above-described operations of the second controller.

The second storage 126 may store user identification information and user authentication information.

In a case where a plurality of users of the vehicle exist, the second storage 126 may store user identification information for each user and user authentication information for each user.

The second storage 126 may store identification information of the mobile device for linking to the CarPay service.

The second storage 126 may store user biometric information for user authentication.

The user biometric information may include user's face information, voice information, fingerprint information, vein information, iris information, and the like.

The second storage 126 may be implemented with at least one of a volatile memory such as a Random Access Memory (RAM), a non-volatile memory such as a cache, a flash memory, a Read Only Memory (ROM), a Programmable Read Only Memory (PROM), an Erasable Programmable Read Only Memory (EPROM), an Electrically Erasable Programmable Read Only Memory (EEPROM), etc., or a recording media such as a Hard Disk Drive (HDD), or a Compact Disc Read Only Memory (CD-ROM), without being limited thereto.

The authentication device 130 may include an input device (not shown) for receiving user identification information. Here, the user identification information may include information about at least one of a user's name, ID, or phone number.

The authentication device 130 may include a sensor that detects biometric recognition information for user authentication.

The sensor may include an image sensor that obtains an image of user's face or gestures.

The sensor may include a Complementary Metal Oxide Semiconductor (CMOS) image sensor or a Charge Coupled Device (CCD) image sensor, and a three-dimensional (3D) space recognition sensor such as KINECT (RGB-D sensor), Time Of Flight (TOF) camera, stereo camera, and the like.

The image sensor may include a camera that detects object information around the vehicle and converts into an electrical image signal.

The sensor (not shown) may detect user biometric information.

The user biometric information may include fingerprint information. In this case, the sensor may be a fingerprint sensor. Here, the fingerprint sensor may be a CCD camera or CCD scanner. The fingerprint sensor may include one of an electrostatic sensor, a thermal sensor, or an ultrasonic image sensor.

The user biometric information may include voice information, iris information, or vein information.

In a case where the biometric information is voice information, the sensor may include a microphone.

In a case where the biometric information is iris information, the sensor may include a camera or an infrared camera.

In a case where the biometric information is vein information, the sensor may include a vein scanner or CCD camera.

The sensor may wake up in response to a command to start registration of the user biometric information.

The authentication device 130 may perform user authentication to authenticate the user of the vehicle.

The authentication device 130 may obtain the user biometric information for user authentication, and may obtain biometric recognition information that may recognize the user from the obtained user biometric information.

The authentication device 130 may register and store the obtained biometric recognition information together with the user identification information as information for user authentication of the vehicle.

In a case where the information for user authentication is face information, the authentication device 130 may recognize the user's face based on image information obtained through the sensor, and may perform user authentication based on face recognition information about the recognized face and pre-registered face recognition information.

In addition to the user authentication based on face recognition, the authentication device 130 may perform user authentication based on at least one of fingerprint recognition information, voice recognition information, vein recognition information, or iris recognition information.

In response to receiving the biometric recognition information from the mobile device 2, the authentication device 130 may obtain a similarity between the biometric recognition information received from the mobile device 2 and pre-registered biometric recognition information, and may control update of the pre-registered biometric recognition information based on the obtained similarity.

In addition, the authentication device 130 may control at least one of the display 122 or the speaker 123 of the second terminal device 120 to output guide information suggesting the update of pre-stored biometric recognition information, based on the similarity between the pre-registered biometric recognition information and the received biometric recognition information.

Based on the user authentication being successful, the authentication device 130 may transmit user authentication success information and user identification information to the first terminal device 110 and the first processor 150.

Based on the user authentication not being successful, the authentication device 130 may transmit user authentication failure information to the first terminal device 110 and the first processor 150.

In response to receiving a command to register the biometric recognition information through the input part 121 of the second terminal device 120 or an input device (not shown) provided in the vehicle 1, the authentication device 130 may activate the sensor of the authentication device, obtain user biometric information based on biometric information obtained through the activated sensor, obtain biometric recognition information, which is characteristic information of the user, from the obtained biometric information, and store the obtained biometric recognition information.

In addition, the authentication device 130 may control output of guide information about a registration process of biometric recognition information. In controlling the output of guide information, the authentication device 130 may control operations of the display 122 and the speaker 123 of the second terminal device.

In response to receiving the biometric recognition information from the mobile device 2 in a state where the biometric recognition information is not registered, the authentication device 130 may register the received biometric recognition information as biometric recognition information for user authentication.

The authentication device 130 may register and store the user identification information together with the biometric recognition information.

In response to receiving a command to delete biometric recognition information, the authentication device 130 may control deletion of biometric recognition information of a user registered.

This authentication device 130 may be provided in a head unit of the vehicle.

The authentication device 130 may also be provided in the second terminal device 120.

The first communication device 140 may communicate with the mobile device 2, the first server 3, the second server 4, as well as the RSE S2.

The first communication device 140 may transmit information received from at least one of the mobile device 2, the first server 3, the second server 4, or the RSE S2 to the first processor 150. The first communication device 140 may transmit various information to at least one of the mobile device 2, the first server 3, the second server 4, or the RSE S2 based on a control command of the first processor 150.

The first communication device 140 may include at least one constituent component enabling communication between various external devices and the constituent components of the vehicle 1, for example, at least one of a short-range communication module, wireless communication module, or a wired communication module.

The short-range communication module may include a variety of short-range communication modules that transmit and receive signals in a short distance using a wireless communication network, such as a Bluetooth module, infrared communication module, Radio Frequency Identification (RFID) communication module, Wireless Local Access Network (WLAN) communication module, Near-Field Communication (NFC) communication module, Zigbee communication module, and the like.

The wired communication module may include various wired communication modules such as a Controller Area Network (CAN) communication module, Local Area Network (LAN) module, Wide Area Network (WAN) module, Value Added Network (VAN) module, or the like, and also include various cable communication modules such as a Universal Serial Bus (USB), High Definition Multimedia Interface (HDMI), Digital Visual Interface (DVI), Recommended Standard 232 (RS-232), power line communication, Plain Old Telephone Service (POTS), or the like.

The wired communication module may further include a Local Interconnect Network (LIN).

The wireless communication module may include wireless communication modules that support a variety of wireless communication methods such as a Global System For Mobile Communication (GSM), Code Division Multiple Access (CDMA), wideband CDMA (WCDMA), Universal Mobile Telecommunications System (UMTS), Time Division Multiple Access (TDMA), Long Term Evolution (LTE), and the like, in addition to a Wi-fi module and a Wibro module.

The first processor 150 may transmit and receive information with the first terminal device 110, the second terminal device 120 and the authentication device 130.

The first processor 150 may control a Connected Car Service (CCS).

The first processor 150 may store membership registration information for the Connected Car Service, and may control the first communication device 140 based on the membership registration information for the Connected Car Service. The first processor 150 may control the first communication device 140 to transmit and receive information with the mobile device 2, the first server 3 and the second server 4.

Membership registration (subscription) for the Connected Car Service may be performed through the second terminal device of the vehicle or the mobile device.

The Connected Car Service provides services such as remotely starting and diagnosing the vehicle, making and receiving calls, messages, and emails, providing real-time traffic information, emergency assistance, and the like, through a network or Internet connection in or around the vehicle.

The Connected Car Service enables vehicle control, vehicle management, and the like by using applications on the mobile device, the first terminal device, and the second terminal device in the vehicle.

The first processor 150 may control at least one of a remote control service or the CarPay service through the Connected Car Service.

The first processor 150 may also perform user authentication through the Connected Car Service.

The first processor 150 may also control the CarPay service through a digital key registered in the mobile device 2.

In response to communicatively connecting to the mobile device 2 through the first communication device, the first processor 150 may control the CarPay service by linking to the first application of the mobile device 2.

When communicatively connected to the mobile device 2, the first processor 150 may receive CarPay information about the CarPay service, and may control the second terminal device 120 to display the received CarPay information.

The CarPay information may include membership registration information for the CarPay service, CarPay usage history information, payment registration information for use of the CarPay service, and authentication information for executing the CarPay service.

The CarPay information may include payment information using an IC chip.

The first processor 150 may receive a card issuance request or a card deletion request from the first server 3, and may deliver a card issuance command or card deletion command received from the first server 3 to the first terminal device 110.

The first processor 150 may deliver, to the first terminal device 110, user authentication success information or user authentication failure information received from the authentication device 130 or the second terminal device 120.

The first processor 150 may control activation and standby state of the first terminal device 110 to perform payment for services received by the user or for products purchased by the user.

For example, when a vehicle approaches a tollgate, the first processor 150 may determine whether the vehicle is before entering the tollgate based on navigation information of the second terminal device. Based on a determination that the vehicle is before entering the tollgate, the first processor 150 may automatically activate a CarPay application set up on the second terminal device, control the first terminal device 110 to be in a payment standby state, and automatically pay a toll through the first terminal device 110 when the vehicle passes through the tollgate.

In determining whether the vehicle is before entering the tollgate, the first processor 150 may determine whether a distance from a current location of the vehicle to the tollgate is a preset distance based on current location information and tollgate location information, and when it is determined that the distance from the current location to the tollgate is the preset distance, the first processor 150 may determine that the vehicle is before entering the tollgate.

In response to receiving confirmation request information about whether the first terminal device is being used normally (e.g., within predetermined bounds, such being consistent with a historical usage pattern) from the first server 3, the first processor 150 may control the second terminal device 120 to display guide information requesting confirmation on whether the first terminal device is being used normally.

In response to receiving confirmation information through the input part 121 of the second terminal device, the first processor 150 may transmit the received confirmation information to the first server 3. Here, the confirmation information may include normal usage information of the first terminal device and abnormal usage information of the first terminal device.

In response to receiving user identification information and IC chip deletion request information from the first server 3, the first processor 150 may transmit the user identification information and the IC chip deletion request information to the first terminal device. The IC chip deletion request information may be deletion request information of payment registration information stored in the IC chip.

In response to the confirmation information not being received through the input part 121 of the second terminal device, the first processor 150 may transmit, to the first server 3, information about not receiving the confirmation information.

The first processor 150 may obtain and store usage pattern information of the first terminal device based on passage information of tollgate collected for a predetermined time period, and may determine whether the first terminal device is being used abnormally (e.g., outside predetermined bounds, such as being inconsistent with a historical usage pattern) based on the stored usage pattern information of the first terminal device and passage information of tollgate received (e.g., recorded by the vehicle) after a last start ON command was received (e.g., by the vehicle). The first processor 150 may control the second terminal device to output confirmation information requesting confirmation of abnormal use of the first terminal device, in response to the determination that the first terminal device is being used abnormally.

The first processor 150 may perform overall control of driving the vehicle.

The first processor 150 may be implemented as a memory (not shown) that stores an algorithm for controlling operations of constituent components of the vehicle or data about a program that reproduces the algorithm, and a processor (not shown) that performs the above-described operations using the data stored in the memory.

The first memory 151 may store vehicle identification information and user identification information.

The Identification information of the vehicle 1 may include information about a vehicle class, vehicle model, vehicle identification number (vehicle license plate), power generation method (e.g., hybrid, electric, internal combustion engine, hydrogen, etc.), and the like.

The first memory 151 may store identification information of a mobile device performing a digital key service, authentication information of the mobile device, and a digital key.

The first memory 151 may store identification information of the mobile device 2 for performing the CarPay service, payment registration information, and user authentication information (e.g., password).

In a case where a plurality of users exist, the first memory 151 may store user identification information for each user, identification information of mobile device for each user, payment registration information for each user, and user authentication information for each user.

In a case where a plurality of users exist, the first memory 151 may further store biometric recognition information for each user.

The payment registration information may include card information and account information.

The card information may include information about at least one of a card company, card number, expiration date, password, and security code (e.g., CVC).

The account information may include information about a bank type, account number, account password, and account holder name.

The identification information of the mobile device is unique identification information of the mobile device, and may include at least one of phone number, Wi-Fi MAC Address, serial number, or International Mobile Equipment Identity (IMEI) of the mobile device 2.

The identification information of the mobile device 2 may be Bluetooth Identification information (BTID).

The first memory 151 may store user authentication information and biometric recognition information corresponding to user identification information.

The user identification information may include account information of a user.

The user's account information may include the user's phone number, name, email address, and photo that the user entered when contracting the vehicle.

The user's account information may be the same as user account information registered through the application set up on the mobile device 2.

The biometric recognition information may include at least one of face recognition information, fingerprint recognition information, iris recognition information, vein recognition information, or voice recognition information.

The first memory 151 may delete the user identification information and the biometric recognition information in response to a control command of the first processor 150.

The first memory 151 may be implemented with at least one of a volatile memory such as a Random Access Memory (RAM), a non-volatile memory such as a cache, a flash memory, a Read Only Memory (ROM), a Programmable Read Only Memory (PROM), an Erasable Programmable Read Only Memory (EPROM), an Electrically Erasable Programmable Read Only Memory (EEPROM), etc., or a recording media such as a Hard Disk Drive (HDD), or a Compact Disc Read Only Memory (CD-ROM), without being limited thereto.

The first memory 151 and the first processor 150 may be integrated into one chip, or provided in physically separated locations.

At least one constituent component may be added or omitted corresponding to the performances of the constituent components of the vehicle illustrated in FIG. 3, the first terminal device illustrated in FIG. 4, and the second terminal device illustrated in FIG. 5. Also, it will be easily understood by those skilled in the art that mutual positions of the constituent components may be modified corresponding to the performance or structure of the vehicle.

Meanwhile, each of the constituent components shown in FIG. 3, FIG. 4, and FIG. 5 refers to a software, and/or a hardware component such as a field-programmable gate array (FPGA) or an application-specific integrated circuit (ASIC).

Figure 6:
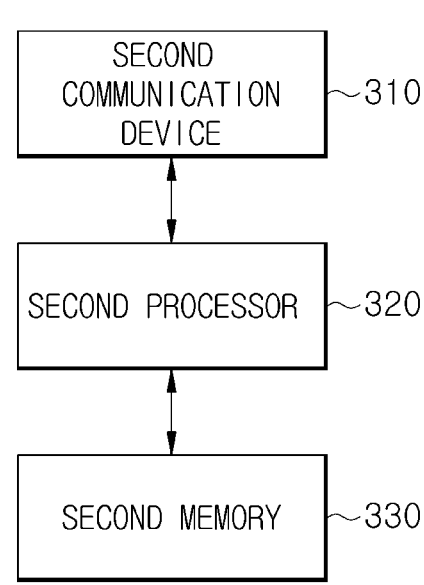
FIG. 6 is a control block diagram illustrating a first server according to an embodiment.

FIG. 6 is a control block diagram illustrating a first server according to an embodiment.

The first server 3 may be a server of a vehicle manufacturer, or may be a server provided at a service center that manages the vehicle 1. The first server 3 may also be a server of an application (i.e., app) providing a service associated with the vehicle 1, a telematics server or platform server. In addition, the first server 3 may be a server used in a vehicle development stage.

The first server 3 may be any one of a card company server, a simple payment service provider's (e.g., smart pay service) server, a vehicle manufacturer's server, a digital key service provider's server, or a vehicle management server.

As shown in FIG. 6, the first server 3 may include a second communication device 310, a second processor 320, and a second memory 330.

The second communication device 310 may communicate with the vehicle 1, the mobile device 2, and the second server 4.

The second communication device 310 may include at least one constituent component enabling communication with various external devices and the constituent components of the first server 3, for example, at least one of a short-range communication module, a wireless communication module, or a wired communication module.

Detailed examples of the short-range communication module, wired communication module, and wireless communication module are the same as those of the first communication device, and thus description thereof is omitted.

The second processor 320 may allow payment service to proceed through the CarPay based on payment registration information and authentication success information received from the mobile device 2.

The second processor 320 may allow payment to proceed through the CarPay service based on payment registration information and user authentication success information received from the second terminal device 120.

The second processor 320 may receive passage information from the first communication device 140 of the vehicle or the first terminal device 110 of the vehicle for a predetermined time period, obtain a usage pattern based on the received passage information, and store usage pattern information about the obtained usage pattern in the second memory 330. The usage pattern may be a usage pattern of the vehicle, a usage pattern of the first terminal device, or a usage pattern of an IC chip.

The predetermined time period may span from a point in time before an input of a start ON command to a predetermined point in time in the past. For example, the predetermined time period may be a period from yesterday to one month ago.

The predetermined time period may include a period from a time of membership registration through the first application for the CarPay service to a preset time. For example, the predetermined time period may be a one-month period from the time of membership registration through the first application.

As shown in FIG. 7, the second processor 320 may obtain and store usage pattern information of the first terminal device for each user.

The usage pattern information of the first terminal device is based on passage information, and may include identification information of a tollgate and passage time information, and may further include location information of the tollgate.

The second processor 320 may also obtain the usage pattern based on passage information received while driving the predetermined number of times from the time of membership registration.

The second processor 320 may obtain usage information based on currently received passage information, and determine whether a use of the first terminal device deviates from a pre-stored usage pattern based on the obtained usage information and pre-stored usage pattern information. Based on a determination that the use of the first terminal device deviates from the pre-stored usage pattern, it may be determined that the first terminal device is being used abnormally (e.g., outside predetermined bounds, such as being inconsistent with a historical usage pattern), and based on a determination that the use of the first terminal device falls within the pre-stored usage pattern, it may be determined that the first terminal device is being used normally.

The currently received passage information may include passage information received after a last start ON command of the vehicle is input.

After obtaining the usage pattern information of the first terminal device, the second processor 320 may determine whether the use of the first terminal device deviates from the pre-stored usage pattern.

The usage pattern information of the first terminal device may correspond to usage pattern information of the vehicle.

When determining whether the use of the first terminal device deviates from the pre-stored usage pattern based on the obtained usage information and the pre-stored usage pattern information, the second processor 320 may confirm tollgate identification information (first tollgate identification information) and passage time information of the tollgate (first passage time information) based on the pre-stored usage pattern information, and may confirm tollgate identification information (second tollgate identification information) and passage time information of the tollgate (second passage time information) based on the received passage information.

In addition, the second processor 320 may determine whether the first tollgate identification information and the second tollgate identification information are the same. Based on a determination that the first tollgate identification information and the second tollgate identification information are the same, the second processor 320 may determine whether the first passage time information and the second passage time information are the same or similar to each other. Based on a determination that the first passage time information and the second passage time information are the same or similar to each other, the second processor 320 may determine that the use of the first terminal device falls within the pre-stored usage pattern.

Based on a determination that the first tollgate identification information and the second tollgate identification information are different from each other or the first passage time information and the second passage time information are different from each other, the second processor 320 may determine that the use of the first terminal device deviates from the pre-stored usage pattern.

The second processor 320 may determine that the use of the first terminal device deviates from the pre-stored usage pattern, based on passage time information and tollgate identification information, included in the pre-stored usage pattern information, and the passage time information and tollgate identification information included in the received passage information.

When determining whether the use of the first terminal device deviates from the pre-stored usage pattern based on the obtained usage information and the pre-stored usage pattern information, the second processor 320 may confirm tollgate location information (first tollgate location information) based on the pre-stored usage pattern information, confirm tollgate location information (second tollgate location information) based on the received passage information, and determine whether the first tollgate location information and the second tollgate location information are the same.

Based on a determination that the first terminal device is being used abnormally, the second processor 320 may transmit, to the vehicle 1, confirmation request information requesting confirmation on whether the first terminal device is being used normally.

Here, abnormal use of the first terminal device may include abnormal use of the vehicle and abnormal use of an IC chip.

In response to receiving confirmation information from the vehicle 1, the second processor 320 may determine whether the received confirmation information is same user information or different user information (e.g., the received confirmation information is information about whether users are different, or information about whether a user has changed). Based on a determination that the received confirmation information is the same user information, the second processor 320 may maintain the IC chip of the first terminal device in an issued state, and based on a determination that the received confirmation information is the different user information (e.g., an indication that a user associated with the last tollgate passage is different from a user associated with the stored usage pattern), the second processor 320 may transmit, to the vehicle 1, deletion request information of payment registration information of the IC chip of the first terminal device.

The second processor 320 may also receive information about not receiving the confirmation information from the vehicle 1.

In response to the confirmation information not being received from the vehicle 1, the second processor 320 may request identification information of a vehicle's user from a server (not shown) of toll road authority.

In response to receiving the identification information of the vehicle's user from the toll road authority's server (not shown), the second processor 320 may compare the received identification information of the vehicle's user with user identification information included in the received passage information. Based on a determination that the identification information of the vehicle's user is different from the user identification information included in the received passage information, the second processor 320 may determine that the user of the vehicle has changed, and based on a determination that the identification information of the vehicle's user is the same as the user identification information included in the received passage information, the second processor 320 may determine that the user of the vehicle has not changed.

Based on a determination that the user of the vehicle has changed, the second processor 320 may transmit, to the vehicle 1, the deletion request information of payment registration information of the IC chip of the first terminal device.

In response to receiving deletion request information of the user identification information and the payment registration information from the second server 4, the second processor 320 may transmit, to the vehicle 1, the deletion request information of the user identification information and the payment registration information.

A single second processor 320 or a plurality of second processors 320 may be provided.

The second processor 320 may be implemented as a memory (not shown) that stores an algorithm for controlling operations of constituent components of the first server 3 or data about a program that reproduces the algorithm, and a processor (not shown) that performs the above-described operations using the data stored in the memory. In this instance, the memory and processor may be implemented as separate chips. Alternatively, the memory and processor may be implemented as a single chip.

The second memory 330 may store identification information of a user using the vehicle 1 (user identification information), vehicle identification information, and identification information of mobile device.

The user identification information, the vehicle identification information and the identification information of at least one mobile device 2 stored in the first server 3 may be information registered through the application set up on the mobile device 2 or the second terminal device 120 of the vehicle.

The second memory 330 may store payment registration information that matches the vehicle identification information and the user identification information.

The second memory 330 may store usage pattern information of vehicle corresponding to the user identification information. The usage pattern information of the vehicle may be usage pattern information of the first terminal device.

The usage pattern information of the vehicle may be usage pattern information of the vehicle or the first terminal device for a predetermined time period.

The second memory 330 may be implemented with at least one of a volatile memory such as a Random Access Memory (RAM), a non-volatile memory such as a cache, a flash memory, a Read Only Memory (ROM), a Programmable Read Only Memory (PROM), an Erasable Programmable Read Only Memory (EPROM), an Electrically Erasable Programmable Read Only Memory (EEPROM), etc., or a recording media such as a Hard Disk Drive (HDD), or a Compact Disc Read Only Memory (CD-ROM), without being limited thereto.

Meanwhile, each of the constituent components shown in FIG. 6 refers to a software, and/or a hardware component such as a field-programmable gate array (FPGA) or an application-specific integrated circuit (ASIC).

At least one constituent component may be added or omitted corresponding to the performance of the constituent components of the first server 3 illustrated in FIG. 6. Also, it will be easily understood by those skilled in the art that mutual positions of the constituent components may be modified corresponding to the performance or structure of the system.

Figure 8A:
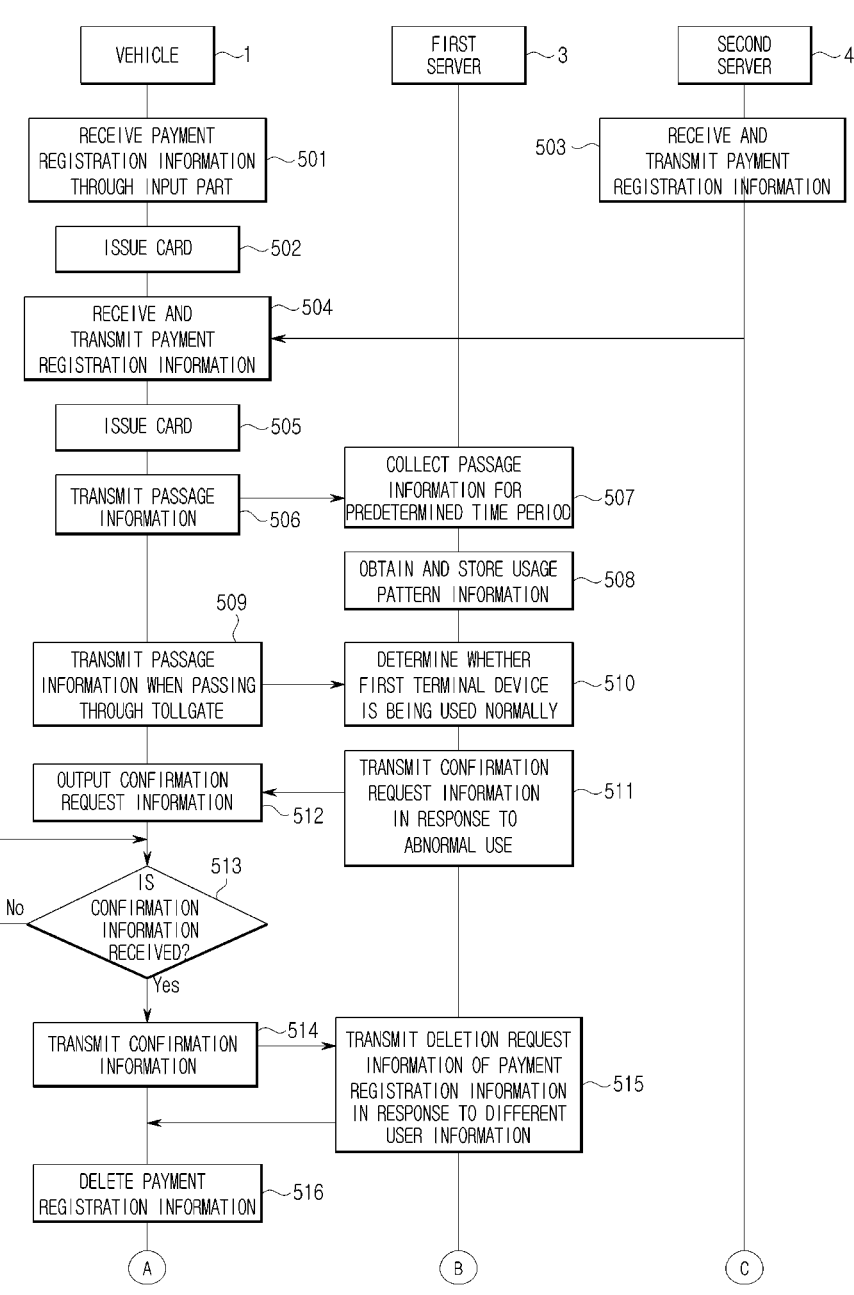
FIG. 8A and FIG. 8B are flowcharts illustrating control operations between a first server, a second sever, and a vehicle according to an embodiment.
Figure 8B:
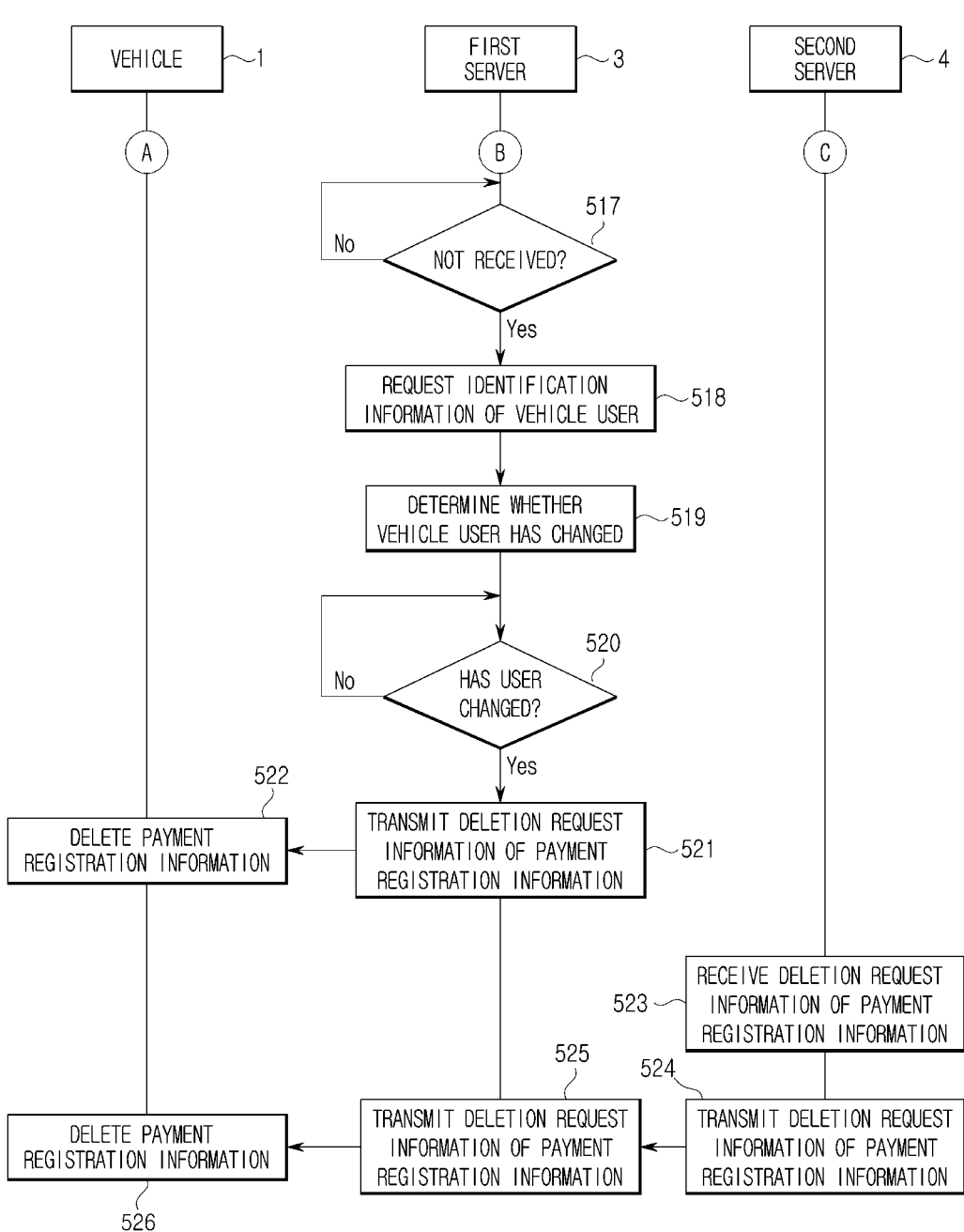

FIG. 8A and FIG. 8B are flowcharts illustrating control operations between a first server, a second server, and a vehicle according to an embodiment.

In response to completing membership registration for the Connected Car Service and receiving user identification information and payment registration information through the input part 121 of the second terminal device 120 (501), the vehicle may match and store the received user identification information with payment registration information, and issue a card (e.g., a virtual card) for toll payment through an IC chip of the first terminal device based on the user identification information and the payment registration information (502).

The second server 4 may receive the user identification information and the payment registration information from a user who has completed membership registration through an application for the CarPay service.

The second server 4 may transmit the received user identification information and payment registration information to the vehicle 1 (503).

In response to receiving the user identification information and the payment registration information from the second server 4 (504), the vehicle may also issue a card (e.g., a virtual card) for toll payment through the IC chip of the first terminal device based on the user identification information and the payment registration information (505).

The vehicle may display information related to toll payment using the second terminal device 120. The information related to toll payment may be HI-PASS information.

Figure 9:
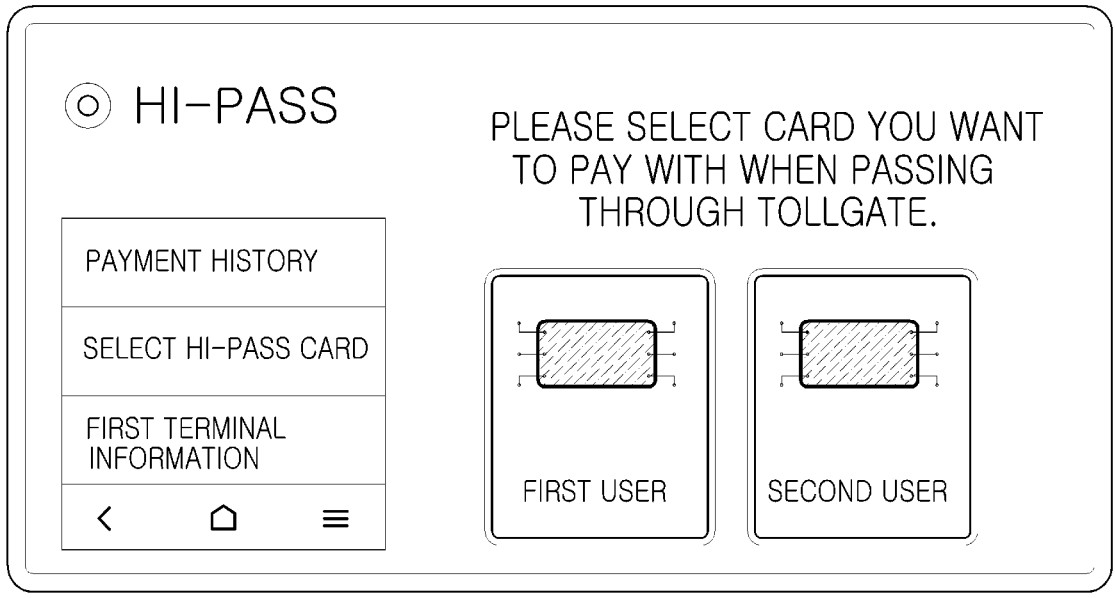
FIG. 9 is a diagram illustrating an example display of a second terminal device of a vehicle according to an embodiment.

As shown in FIG. 9, the vehicle may use the second terminal device 120 to display a payment history button for requesting display of toll payment history, a HI-PASS card button for selecting a card for paying a toll, and a first terminal device information button requesting display of information about the first terminal device.

When the HI-PASS card button displayed on the second terminal device 120 is selected, the vehicle may display cards that may be used for toll payment when passing through the tollgate.

The vehicle may set the card selected from the displayed cards through the input part 121, as the card for toll payment.

In addition, the vehicle may automatically set one of a plurality of cards to pay tolls in response to user recognition and user authentication.

In response to the toll being paid by the first terminal device when passing through the tollgate, the vehicle may transmit passage information (e.g., first passage information or historic passage information received at a first time) to the first server 3 (506).

In response to receiving the passage information from the vehicle 1, the first server 3 may store the received passage information.

The first server 3 may collect the stored passage information for a predetermined time period (507), obtain (e.g., determine) usage pattern information of the first terminal device based on the collected passage information and store the obtained usage pattern information of the first terminal device (508).

The first server 3 may match and store the usage pattern information of the first terminal device with the user identification information.

The first server 3 may also match and store the usage pattern information of the first terminal device with the user identification information and payment registration information.

In response to the toll being paid by the first terminal device when passing through the tollgate, the vehicle 1 may transmit passage information (e.g., second passage information transmitted at a second time after the first time) to the first server 3 (509). Here, the passage information may include tollgate identification information, passage time information, and may further include tollgate location information, passage day information and passage date information.

In response to receiving the passage information, the first server 3 may determine whether the first terminal device is being used normally based on the received passage information and pre-stored usage pattern information (510).

More specifically, the first server 3 may obtain usage information based on the received passage information and determine whether the use of the first terminal device deviates from a pre-stored usage pattern based on the obtained usage information and pre-stored usage pattern information. Based on a determination that the use of the first terminal device deviates from the pre-stored usage pattern, it may be determined that the first terminal device is being used abnormally, and based on a determination that the use of the first terminal device falls within the pre-stored usage pattern, it may be determined that the first terminal device is being used normally.

Determining whether the use of the first terminal device deviates from the pre-stored usage pattern based on the obtained usage information and the pre-stored usage pattern information may include: confirming tollgate identification information (first tollgate identification information) and passage time information (first passage time information) based on the pre-stored usage pattern information, confirming tollgate identification information (second tollgate identification information) and passage time information (second passage time information) based on the received passage information, determining whether the first tollgate identification information and the second tollgate identification information are the same, determining whether the first passage time information and the second passage time information are the same or similar to each other based on a determination that the first tollgate identification information and the second tollgate identification information are the same, and determining that the use of the first terminal device falls within the pre-stored usage pattern based on a determination that the first passage time information and the second passage time information are the same or similar to each other.

Based on a determination that the first tollgate identification information and the second tollgate identification information are different from each other or the first passage time information and the second passage time information are different from each other, the first server 3 may determine that the use of the first terminal device deviates from the pre-stored usage pattern.

The first server 3 may determine that the use of the first terminal device deviates from the pre-stored usage pattern, based on passage time information and tollgate identification information, included in the pre-stored usage pattern information, and the passage time information and tollgate identification information included in the received passage information.

When determining whether the use of the first terminal device deviates from the pre-stored usage pattern based on the obtained usage information and the pre-stored usage pattern information, the first server 3 may also confirm tollgate location information (first tollgate location information) based on the pre-stored usage pattern information, confirm tollgate location information (second tollgate location information) based on the received passage information, and determine whether the first tollgate location information and the second tollgate location information are the same.

Based on a determination that the first terminal device is being used abnormally, the first server 3 may transmit, to the vehicle 1, confirmation request information requesting confirmation on whether the first terminal device is being used normally (511).

Here, abnormal use of the first terminal device may include abnormal use of the vehicle (e.g., a usage of the vehicle that is inconsistent with a historical usage pattern of the vehicle) and abnormal use of an IC chip (e.g., a usage of the IC chip that is inconsistent with a historical usage pattern of the IC chip).

In response to receiving the confirmation request information from the first server, the vehicle 1 may control at least one of the display or the speaker of the second terminal device to output the confirmation request information (512).

In response to receiving confirmation information through the input part of the second terminal device (513), the vehicle 1 may transmit the received confirmation information to the first server 3 (514).

In response to receiving the confirmation information from the vehicle 1, the first server 3 may determine whether the received confirmation information is same user information or different user information, i.e., the received confirmation information is information about whether users are different. Based on a determination that the received confirmation information is the same user information, the first server 3 may maintain the IC chip of the first terminal device in an issued state.

Based on a determination that the received confirmation information is the different user information (e.g., the user associated with the latest toll payment or the last received (e.g., second) passage information is different the user associated with the historical usage pattern of the vehicle), the first server 3 may transmit, to the vehicle 1, deletion request information of payment registration information of the IC chip of the first terminal device (515).

In this instance, the vehicle 1 may confirm payment registration information corresponding to the user identification information, and may delete the confirmed payment registration information among payment registration information stored in the first terminal device 110 (516).

The vehicle 1 may also allow information about deletion of the payment registration information to be displayed through the display of the second terminal device.

Based on a determination that the confirmation information is not received from the vehicle 1 (517), the first server 3 may request identification information of vehicle's user and vehicle identification information from a server (not shown) of toll road authority (518).

In response to receiving information about not receiving the confirmation information from the vehicle 1, the first server 3 may also request the vehicle identification information and the identification information of the vehicle's user from the toll road authority's server (not shown).

In response to receiving the identification information of the vehicle's user from the toll road authority's server (not shown), the first server 3 may compare the received user identification information with user identification information corresponding to the received passage information to determine whether the user of the vehicle has changed (519).

Based on a determination that the received user identification information and the user identification information corresponding to the received passage information are different from each other, the first server 3 may determine that the user of the vehicle has changed, and based a determination that the received user identification information and the user identification information corresponding to the received passage information are the same, the first server 3 may determine that the user of the vehicle has not changed.

Based on a determination that the user of the vehicle has changed (520), the first server 3 may transmit, to the vehicle 1, deletion request information of the user identification information and the payment registration information (521). In this instance, the vehicle 1 may confirm the payment registration information corresponding to the user identification information, and delete the confirmed payment registration information among payment registration information stored in the first terminal device 110 (522).

In response to receiving the deletion request information of the user identification information and the payment registration information (523), the second server 4 may transmit the deletion request information of the payment registration information to the first server 3 (524).

In this instance, in response to receiving the deletion request information of the user identification information and the payment registration information (e.g., by the first server 3 from the second server 4), the first server 3 may transmit, to the vehicle 1, the deletion request information of the user identification information and the payment registration information (525).

The second server 4 may also transmit the deletion request information of the payment registration information to the vehicle 1.

In response to receiving the deletion request information of the user identification information and the payment registration information, the vehicle may confirm payment registration information corresponding to the user identification information, and delete the confirmed payment registration information among the payment registration information stored in the first terminal device 110 (526).

As is apparent from the above, according to the embodiments of the disclosure, in a case where usage information of a first terminal device (terminal device for HI-PASS) deviates from pre-stored usage pattern information, whether a user of a vehicle or the first terminal device has changed may be confirmed by a user, and payment registration information stored in the first terminal device may be deleted in response to the change in user, thereby preventing misuse of the first terminal device. In other words, misuse of IC chip for payment embedded in the first terminal device may be prevented.

According to the embodiments of the disclosure, whether a vehicle has been stolen may be determined based on user's confirmation information about whether a user has changed.

According to the embodiments of the disclosure, by paying tolls using an IC chip for payment embedded in a first terminal device, inconvenience of having to physically insert a credit card into the first terminal device may be eliminated, and a risk of losing the inserted credit card may be prevented.

According to the embodiments of the disclosure, the amount of plastic used in manufacturing credit cards may be reduced, thereby contributing to eco-friendliness.

According to the embodiments of the disclosure, payment registration information may be easily input and stored through an application for CarPay service set up on a mobile device.

According to the embodiments of the disclosure, payment details (date, time, amount, company paid to) of CarPay and payment details of a first terminal device may be displayed on a second terminal device (AVN terminal device) through communication between a mobile device and a vehicle, allowing a user to quickly and easily check the payment details of CarPay and the payment details of the first terminal device.

According to the embodiments of the disclosure, only a change in software is required, thereby eliminating a cost of adding and manufacturing hardware.

According to the embodiments of the disclosure, marketability of the vehicle and the first terminal device may be improved, user satisfaction and user reliability may be improved, and competitiveness of the vehicle and the first terminal device may be secured.

Meanwhile, the above embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions decoded by a computer are stored in, for example, a read only memory (ROM), random access memory (RAM), magnetic tapes, magnetic disks, flash memories, optical recording medium, and the like.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A server comprising:

Personal Secure Application Module (PerSAM) configured to issue an authorization key;

a communication device configured to communicate with a vehicle;

a processor configured to determine, based on first passage information associated with a tollgate, usage pattern information of the vehicle, wherein the first passage information is received from the vehicle at a first time; and memory configured to store the determined usage pattern information of the vehicle, wherein the processor is further configured to:

determine, based on second passage information received from the vehicle at a second time after the first time, whether usage of the vehicle is consistent with the stored usage pattern information, wherein the stored usage pattern information of the vehicle comprises usage pattern information of a terminal device provided in the vehicle, wherein the terminal device comprises an integrated circuit (IC) chip for toll payment at the tollgate, wherein the IC chip comprises an Issuer Security Domain (ISD) and Supplementary Security Domain (SSD), wherein the SSD and an applet are received or deleted by the ISD, based on a determination that the usage of the vehicle is inconsistent with the stored usage pattern information, transmit, to the vehicle, a request to confirm the usage of the vehicle, based on not receiving, from the vehicle, a confirmation of the usage of the vehicle, obtain first identification information associated with a user of the vehicle; and based on the first identification information being different from second identification information associated with a second user associated with the first passage information, transmit, to the vehicle, a request to delete payment registration information stored in the IC chip, control the vehicle to delete the payment registration information stored in the IC chip, using the authorization key, based on the vehicle receiving the authorization key and the request, and control the vehicle to delete the SSD and the applet based on the payment registration information stored in the IC chip being deleted.

2. The server of claim 1, wherein the processor is configured to determine the usage pattern information of the vehicle by:

collecting, over a predetermined time period, the first passage information associated with the tollgate; and determining the usage pattern information of the vehicle based on the first passage information collected over the predetermined time period.

3. The server of claim 1, wherein the processor is configured to determine whether the usage of the vehicle is consistent with the stored usage pattern information by:

comparing the stored usage pattern information with a portion, of the second passage information, that was recorded after a last start ON command of the vehicle was received by the vehicle.

4. The server of claim 1, wherein the processor is configured to determine whether the usage of the vehicle is consistent with the stored usage pattern information by:

obtaining, based on the second passage information, usage information of the vehicle, wherein the usage information comprises:

identification information associated with the tollgate, and passage time information associated with the tollgate;

comparing the usage information with the stored usage pattern information of the vehicle to determine whether the usage of the vehicle deviates from the stored usage pattern information of the vehicle; and determining that the usage of the vehicle is inconsistent with the stored usage pattern information based on a determination that the usage of the vehicle deviates from the stored usage pattern information of the vehicle.

5. The server of claim 1, wherein the processor is further configured to:

based on receiving, from the vehicle, a confirmation of the usage of the vehicle, determine whether the received confirmation indicates that a first user associated with the second passage information is different from a second user associated with the stored usage pattern information of the vehicle; and transmit, to the vehicle and based on a determination that the received confirmation indicates that the first user is different from the second user, a request to delete payment registration information stored in the vehicle.

6. The server of claim 1, wherein the server is a first server, wherein the communication device is configured to communicate with a second server, and wherein the processor is further configured to, based on receiving, from the second server, a request to delete payment registration information stored in the vehicle, transmit the received request to the vehicle.

* * * * *